United States Patent
Schluep et al.

(10) Patent No.: US 11,384,587 B2
(45) Date of Patent: Jul. 12, 2022

(54) USER INTERFACE UNIT

(71) Applicant: GEZE GmbH, Leonberg (DE)

(72) Inventors: Thomas Schluep, Novato, CA (US);
Hermann Beer, Wolfhalden (CH);
Christoph Weber, Stuttgart (DE);
Martin Wellnitz, Leonberg (DE)

(73) Assignee: Geze GmbH, Leonberg (DE)

( * ) Notice: Subject to any disclaimer, the term of this patent is extended or adjusted under 35 U.S.C. 154(b) by 248 days.

(21) Appl. No.: 16/909,746

(22) Filed: Jun. 23, 2020

(65) Prior Publication Data

US 2020/0408023 A1    Dec. 31, 2020

(30) Foreign Application Priority Data

Jun. 28, 2019   (DE) .................. 102019209521.6

(51) Int. Cl.
*E05F 15/60* (2015.01)
*G06F 3/0482* (2013.01)

(52) U.S. Cl.
CPC ............ *E05F 15/60* (2015.01); *G06F 3/0482* (2013.01); *E05Y 2900/132* (2013.01)

(58) Field of Classification Search
CPC ... E05F 15/60; G06F 3/0482; E05Y 2900/132
See application file for complete search history.

(56) References Cited

U.S. PATENT DOCUMENTS

2015/0262438 A1   9/2015  Zasowski et al.

FOREIGN PATENT DOCUMENTS

DE   102015110628 A1   3/2016

OTHER PUBLICATIONS

Extended European Search Report issued by the European Patent Office in connection with EPO Application No. 20165300.3-1005 dated Sep. 25, 2020.
German Office Action issued by the German Patent and Trademark Office in connection with German Application No. 102019209521.6 dated Jun. 30, 2020.

*Primary Examiner* — Nabil H Syed
*Assistant Examiner* — Cal J Eustaquio
(74) *Attorney, Agent, or Firm* — Steven M. Shape; Dennemeyer & Associates, LLC

(57) ABSTRACT

A user interface unit for an automatic door drive comprises a display unit for outputting output information and a control element arrangement for capturing input information. The user interface unit, together with the door drive, is mountable in a first spatial position and in a second spatial position on a door that is drivable by the door drive. The control element arrangement comprises a first control element and a second control element, wherein the first control element is arranged in the first spatial position of the user interface unit on the same spatial side of the control element arrangement as the second control element in the second spatial position. The display unit is designed to display the displayed output information in the same spatial orientation in both the first spatial position and the second spatial position of the user interface unit. In addition, the user interface unit is designed to capture the same input information in the first spatial position with the first control element as with the second control element in the second spatial position.

19 Claims, 10 Drawing Sheets

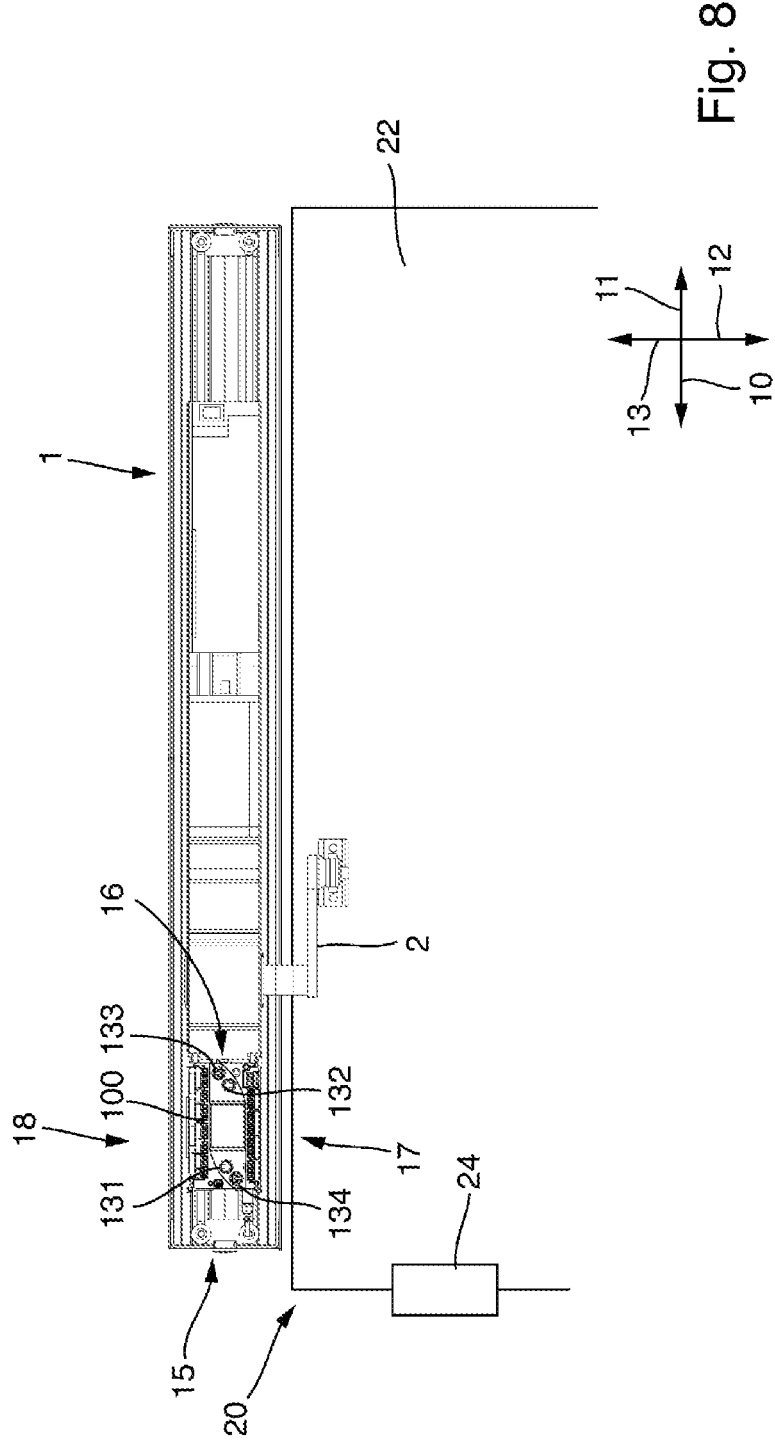

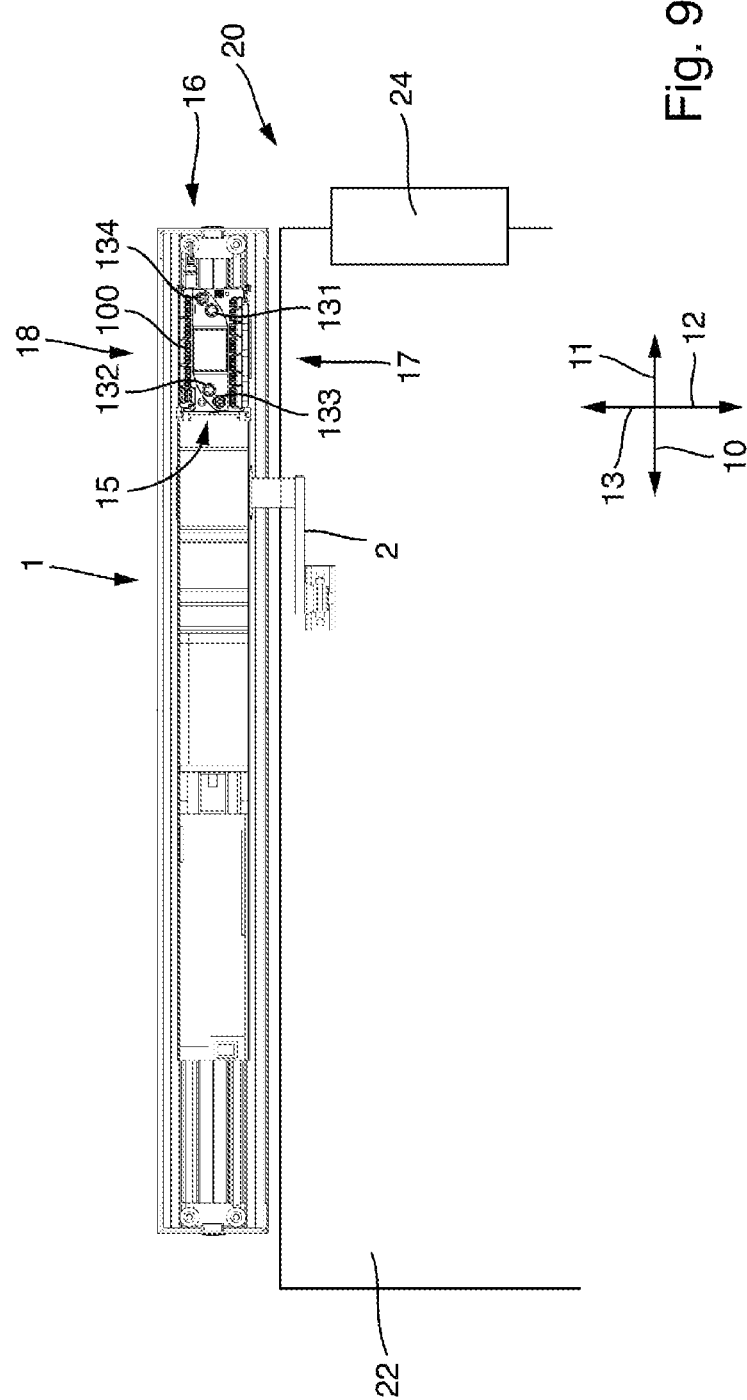

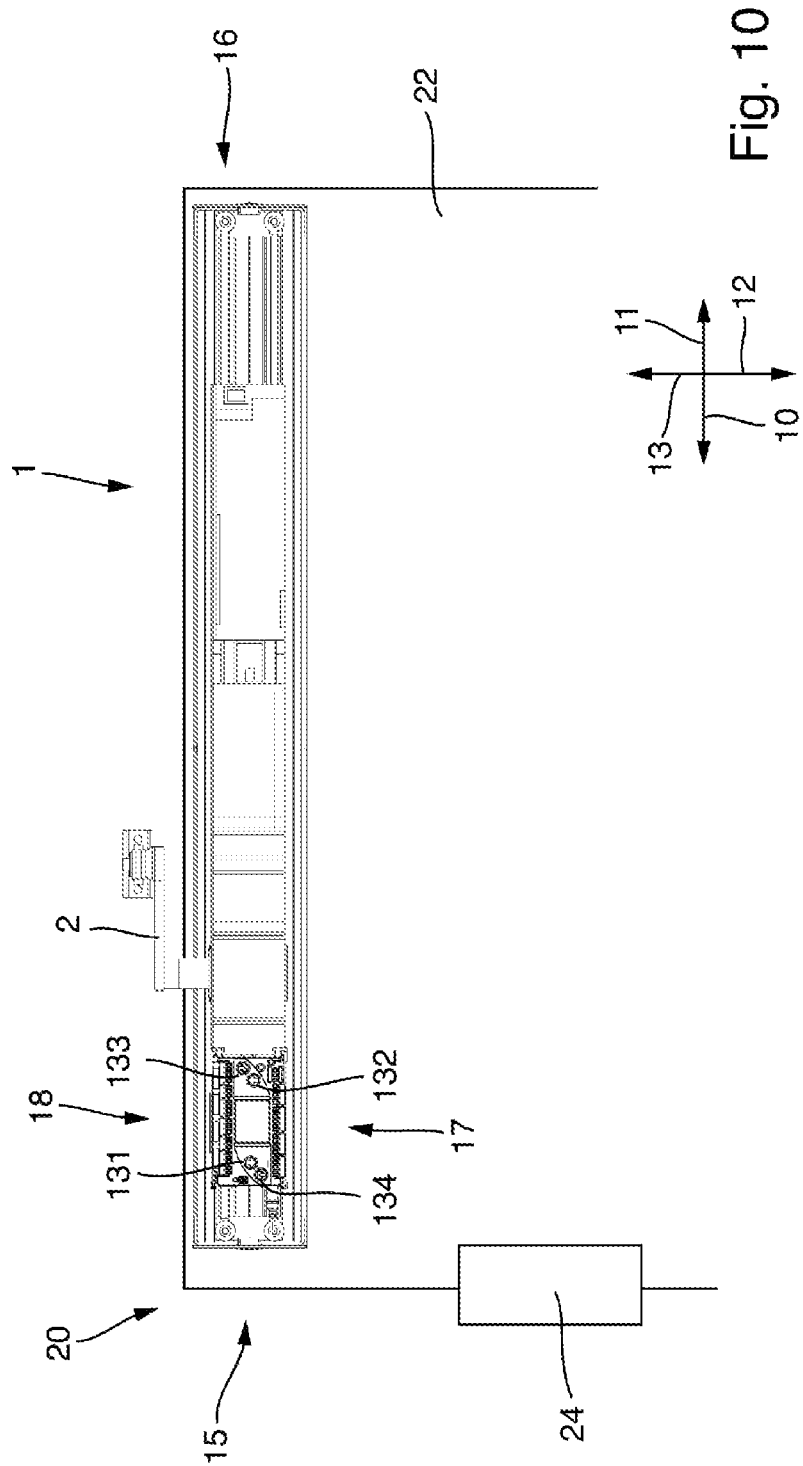

USER INTERFACE UNIT

CROSS-REFERENCE TO RELATED APPLICATIONS

This application claims priority to German application DE102019209521.6, filed Jun. 28, 2019, which is hereby incorporated by reference in its entirety.

BACKGROUND OF THE INVENTION

The present invention relates to a user interface unit for an automatic door drive and an automatic door drive with a user interface unit.

Door drives are used to automatically open and close doors. They typically include a driven lever that connects a door leaf of the driven door to a door frame or another fixed structure of the door. The door drive can actuate the lever, for example, electrically or hydraulically.

Door drives can be mounted on the driven doors in different ways. In a so-called door leaf mounting, the door drive is mounted on the door leaf of the driven door and connected to the door frame via the lever, while in a so-called head mounting, it is mounted on the door frame and connected to the door leaf via the lever. In addition, door drives can be mounted either on the opening side of the door, also called the hinge side, or on the closing side of the door, also called the opposite hinge side. Depending on the opening direction of the door, door drives can either be mounted left-opening on DIN left hinged doors or right-opening on DIN right hinged doors.

In principle, it is desirable to be able to use one and the same door drive for all mounting types if possible. However, it is usually necessary for the door drive to be mountable in at least two different spatial positions or spatial orientations. This may be necessary, for example, if the door drive is to be mountable on the same side of the door either opening to the left or opening to the right or if it is to be mountable either on the opening side or on the closing side of the door with the same hinge direction. Usually, door drives that can be used for several or all mounting types are mountable at least in positions rotated by 180° with respect to one another.

When putting a door drive into operation, the parameters required for operation are set and stored in a control unit of the door drive. For this purpose, the door drive is usually connected, via a data line, to a special programming device which has a user interface with which the required parameters can be set. However, carrying and connecting such a programming device involves a certain amount of effort.

US 2015/0262438 A1 describes a door drive in the housing of which a control device is arranged with a display and an input device designed as a joystick. The control unit is used, among other things, to configure the door drive when putting it into operation. In addition, the door drive described is designed to be arranged on a door both on the opening side and on the closing side, wherein the door drive is mounted in positions rotated by 180° relative to one another. The rotation of the door drive also changes the spatial position of the control unit and of the display and joystick arranged on the control unit. One of the consequences is that the directions of actuation of the joystick are oriented in different spatial directions, depending on the position of the control device, which makes it difficult to operate the control device.

It is an object of the invention to provide a user interface unit for an automatic door drive and an automatic door drive such that the door drive can be mounted and parametrised on a driven door in a simple and flexible manner.

This object is achieved by a user interface unit for an automatic door drive and an automatic door drive according to the independent claims. Further developments are respectively indicated in the dependent claims.

A user interface unit for an automatic door drive comprises a display unit for outputting output information and a control element arrangement for capturing input information. The user interface unit, together with the door drive, is mountable in a first spatial position and in a second spatial position on a door that is drivable by the door drive. The control element arrangement comprises a first control element and a second control element, wherein the first control element is arranged in the first spatial position of the user interface unit on the same spatial side of the control element arrangement as the second control element in the second spatial position. The display unit is designed to display the displayed output information in the same spatial orientation in both the first spatial position and the second spatial position of the user interface unit. In addition, the user interface unit is designed to capture the same input information in the first spatial position with the first control element as with the second control element in the second spatial position.

Such a user interface unit arranged on the door drive enables the door drive to be configured in a simple and convenient manner after mounting on the driven door. In particular, it is not necessary to carry and connect a separate programming device. Since the display unit is designed to always display the output information in the same orientation, regardless of the position of the door drive and the user interface unit, the output information can always be displayed upright and thus easily legibly.

The operability of the user interface unit is further improved by the fact that, regardless of the position of the user interface unit, the control element arranged on a predetermined spatial side of the control element arrangement, the first control element in the first spatial position and the second control element in the second spatial position, is used to capture the same input information. This can ensure that a logical spatial arrangement of the control elements is identical in the first and in the second spatial position and that the various input information is captured regardless of the spatial position of the user interface by means of control elements arranged on the same spatial side of the control element arrangement.

The input information captured via the control element arrangement can be direction-dependent, for example, and be in relation to different spatial directions. It can be used, for example, to shift output information displayed in the display unit as desired, either in a first spatial direction, for example upwards, or in a second spatial direction, for example downwards. Thus, a control element located on a first spatial side of the control element arrangement can always cause the output information to move in the first spatial direction, and a control element located on a second spatial side of the control element arrangement can always cause a movement of the output information in the second spatial direction. The second spatial side can, for example, be arranged opposite the first spatial side.

The first spatial side where the control element causing a shift in the first spatial direction is located can, for example, be an upper side or a right side of the control element arrangement, and the second spatial side where the control element causing a shift in the second spatial direction is located can, for example, be an underside or a left side of the control element arrangement.

The output information represented by the display unit can comprise, for example, a selection menu for selecting a parameter of the door drive, and the input information captured can be, for example, a movement command for setting a selectable menu element of the selection menu. In particular, the input information can be a movement command for a selection element (cursor) shown in the display unit and identifying the selectable menu element. In the user interface unit, a menu element located above the currently selectable menu element can then be marked both in the first and in the second spatial position, using the control element located on the first spatial side of the control element arrangement, for example on the upper side or on the right side of the control element arrangement, and using the control element located on the second spatial side of the control element arrangement, for example on the underside or the left side of the control element arrangement, one below the currently selectable menu element can be marked.

The parameters shown in the display unit and changeable by means of the control elements can be, for example, input parameters, the values of which are to be set, such as configuration parameters of the door drive, and/or output parameters, the values of which are to be displayed, for example status parameters of the door drive.

The display unit can comprise a graphic display, such as an LCD display. The controls can be designed as mechanical controls, such as buttons. The control elements can have a surface made of silicone. They can each include a direction-dependent symbol graphic. The directional dependency of the symbol graphic can, in particular, result in the symbol graphic of the first control element and/or the symbol graphic of the second control element in the first and second spatial position of the user interface unit each being oriented in different spatial directions and that the first control element and/or the second control element are not invariant with respect to a change in position underlying the transfer of the user interface unit from the first position to the second position, for example with respect to a rotation by 180°.

The symbol graphics of the first and second control element can be designed such that the symbol graphic of the second control element in the second spatial position of the user interface unit is aligned along the same spatial directions as the symbol graphic of the first control element in the first spatial position. The symbol graphics can, for example, each comprise an imprint, for example on the control element or next to the control element, or a shape of the control elements. The symbol graphics can each comprise a directional arrow, for example.

The first control element can be arranged on the first spatial side of the control element arrangement, for example on the left side or on the underside of the control element arrangement, and the second control element can be arranged on the second spatial side of the control element arrangement, for example on the right side or on the upper side of the control element arrangement. The first spatial side can in particular be arranged opposite the second spatial side, for example opposite with respect to a centre of the control element arrangement.

The user interface unit can be designed, for example, to be mounted, together with the door drive, in a vertical orientation on the driven door. In particular, it can be designed such that the display unit with the control element arrangement is mounted in a vertical orientation on the driven door so that, for example, a display plane of the display unit is oriented vertically. The user interface unit can, for example, be oriented vertically such that it is oriented parallel to a door leaf of the driven door. The output information can then be displayed upright regardless of the position of the door drive and the user interface unit.

The door driven by the door drive can be designed, for example, as a revolving door, also called a swing door or a hinged door. However, it can also be designed as a sliding door.

The user interface unit can be integrated into the door drive, for example as an assembly connected to the door drive or a component connected to the door drive. The user interface unit can be designed such that, regardless of the spatial position of the door drive, it always assumes the same position relative to the door drive, in particular the same position and orientation, and the spatial position of the user interface unit is thus determined by the spatial position of the door drive. For example, the position of the user interface unit with respect to the door drive can be determined by an arrangement of electrical and/or mechanical connecting elements with which the user interface unit and the door drive, in particular a base plate and/or a control unit of the door drive, are connected to one another.

The user interface unit can, for example, be arranged within a housing of the door drive and can, for example, be covered by the housing after the door drive has been installed. However, it can also be arranged on the door drive so that it is accessible and visible, for example on an outside of the housing.

The user interface unit and the door drive can, for example, be designed to be mounted with the stop side fixed (DIN left or DIN right) in the first spatial position on an opening side and in the second spatial position on a closing side of the driven door, or vice versa. In this case, the user interface unit and the door drive can be designed to be mounted in the second spatial position, each rotated by 180° with respect to the first spatial position. Alternatively or additionally, the user interface unit and the door drive can be designed to be mounted on the same side of the driven door (closing side or opening side) in the first spatial position on a DIN door hinged on the left, and in the second spatial position on a DIN door hinged on the right, or vice versa. In addition, the user interface unit and the door drive can be designed to be mounted on a fixed structure of the driven door, for example on a frame by means of head mounting and on a door leaf of the driven door by means of door leaf mounting.

In a further development of the user interface unit, an arrangement of the control elements of the control element arrangement is invariant with respect to a transfer of the user interface unit from the first spatial position to the second spatial position. As a result, the relative spatial positions at which respective control elements are located in the first spatial position and in the second spatial position of the user interface unit do not change within the control element arrangement. The user interface unit can be designed to capture the same input information regardless of the spatial position of the user interface unit by means of the control elements arranged in the same position in the different spatial positions of the user interface unit. For example, the user interface unit can be designed, by means of the respective control element arranged on the upper side or on the right side of the control element arrangement, to capture input information that causes the display information to be shifted upwards, and by means of the control element arranged on the underside or on the left side of the control element arrangement, to capture input information that causes the display information to be shifted downwards.

In a further development of the user interface unit, the control element arrangement is designed point-symmetrical, for example point-symmetrical with respect to a centre of the control element arrangement and/or a centre of the display unit. The centre of the control element arrangement can be different from the centre of the display unit or coincide therewith. In particular, the positions of the control elements of the control element arrangement and/or the direction-dependent symbol graphics of the control elements can be designed point-symmetrical with respect to the centre of the control element arrangement and/or the centre of the display unit.

In one further development, the user interface unit can be transferred from the first position to the second position by rotating the user interface unit by 180°. The rotation by 180° can in particular be carried out about an axis of rotation oriented perpendicular to a display plane of the display unit. In particular, in such an embodiment of the user interface unit, the second control element in the first spatial position of the user interface unit can be arranged on the same spatial side of the control element arrangement as the first control element in the second spatial position, and the user interface unit can be configured to capture the same input information in the first spatial position with the second control element as in the second spatial position with the first control element.

In a further development of the user interface unit, the first control element is arranged on a first side of the display unit and the second control element is arranged on a second side of the display unit, wherein the first side of the display unit with the first control element in the first spatial position of the user interface unit is arranged on the same spatial side of the of the display unit as second side of the display unit with the second control element in the second spatial position. The first side is preferably arranged opposite the second side.

In particular, the display unit and the control element arrangement can be designed to be invariant with respect to the change in position on which transfer of the user interface unit from the first spatial position to the second spatial position is based so that the position of the control elements with respect to the display unit is identical in the first and second spatial positions of the user interface unit. Here, the same input information, in particular the same direction-dependent input information, can be captured by means of the control elements, which are each in the same position relative to the display unit in the different spatial positions of the user interface unit. With such a user interface unit, the logical arrangement of the control elements is independent of whether the user interface unit is arranged in the first or second spatial position.

In a further development of the user interface unit, the first control element and the second control element are designed to be not invariant with respect to a change in the position of the individual control elements on which the transfer of the user interface unit from the first spatial position to the second spatial position is based, for example with respect to a rotation of the individual control elements by 180°, wherein the first control element in the first position of the user interface unit is aligned along the same spatial direction as the second control element in the second position. In particular, this makes it possible to identify the input information captured in the first spatial position of the user interface unit by means of the first control element, and in the second spatial position of the user interface unit by means of the second control element, by means of a direction-dependent design of the control elements.

Control elements that are designed to not be invariant with respect to the change in position of the individual control elements can in particular be designed in a direction-dependent manner. The control elements can in particular comprise a direction-dependent symbol graphic which identifies the respective input information captured via the individual control elements. The first and second control elements can have the same symbol graphic, wherein the symbol graphic of the first control element is oriented in a different spatial orientation with respect to the control element arrangement than the symbol graphic of the second control element. The symbol graphic of the first control element and the symbol graphic of the second control element can, for example, be oriented opposite to one another.

In a further development of the user interface unit, the control element arrangement has further control elements. Where no differences are described, the further control elements can be designed like the first and second control elements. The user interface unit can in particular comprise a further first control element and a further second control element, wherein, where no differences are described, the further first control element is designed like the first control element and the further second control element is designed like the second control element.

In particular, the user interface unit can be designed to capture the same input information with the further first control element in the first spatial position of the user interface unit as with the further second control element in the second spatial position. The input information in question can be, for example, a selection or confirmation of the selectable menu element and/or a change to a subordinate menu level. In addition, the user interface unit can be designed to capture the same input information with the further first control element in the second spatial position as with the further second control element in the first spatial position. The input information in question can be, for example, a deselection of the selectable menu element and/or a change to a higher-level menu level.

In a further development of the user interface unit, the user interface unit is designed to illuminate the first control element in a first colour and the second control element in a second colour in the first position and to illuminate the second control element in the first colour in the second position. This allows the first colour to be used to mark the input information which is captured in the first spatial position of the user interface unit by the first control element and in the second spatial position of the user interface unit by the second control element. This facilitates the operability of the user interface unit.

In addition, the user interface unit can be designed to illuminate the first control element in the second spatial position in the second colour, so that the input information captured in the first spatial position by means of the second control element, and in the second spatial position by means of the first control element, is marked by the second colour.

In a further development, the user interface unit has a position sensor for automatically determining the installation position on the driven door. This makes it possible to automatically determine whether the user interface unit, together with the door drive, is arranged in the first spatial position or in the second spatial position. The user interface unit can then be designed to capture the predetermined user input either by means of the first control element or by means of the second control element, depending on the determined position. In addition, the user interface unit can be designed to control the display unit depending on the determined position such that the display information is always displayed in the same spatial orientation, for example always upright.

In one further development, the user interface unit is designed to display a selection element in the display unit for selecting individual information elements of the display information, for example individual menu items of a displayed selection menu. In addition, the user interface unit is designed to move the selection element in the same spatial direction, for example upwards or downwards, when the input information is captured in the first position via the first control element, and in the second position via the second control element.

In one further development, the user interface unit has a connecting means arrangement for connection to the door drive, wherein the connecting means arrangement is designed asymmetrical with respect to a transfer of the user interface unit from the first spatial position to the second spatial position. As a result, the relative position of the user interface unit with respect to the door drive is clearly defined and incorrect mounting of the user interface unit on the door drive is avoided. In addition, the user interface unit can also be arranged in a space-saving manner within the door drive, even in the case of an asymmetrical design, since no additional installation space has to be kept free to provide space in both spatial positions for components which are present only once on the user interface unit.

In one further development, the user interface unit is designed as a connection module for connecting sensors and/or actuators of the door drive to a control unit of the door drive, for example to a control unit of the door drive arranged next to the user interface unit. This allows for a particularly space-saving arrangement within the door drive. In addition, door drives which already have a connection module without a user interface unit can also be retrofitted with a user interface unit by replacing the connection module with a user interface unit designed as a connection module.

For example, the sensors can be connected to the connection module via sensor cables, and the actuators via control lines. The sensors and/or actuators can be arranged inside the housing of the door drive and/or outside of the housing of the door drive. The sensors can be designed, for example, as motion sensors or opening buttons, the actuators, for example, as door openers or motor locks.

In a further development of the user interface unit, the user interface unit is designed to capture input information for the configuration of the door drive by means of the control elements. The input information can in particular define configuration parameters of the door drive. Such configuration parameters can, for example, determine an assignment of the door drive to an active leaf or to a fixed leaf of the driven door, an opening speed, a hold-open time, or the like.

The user interface unit according to the invention has a door drive for automatically driving a door, wherein the user interface unit is connected to the door drive. The door drive is mountable on the door in a first spatial drive position and in a second spatial drive position, wherein the user interface unit is arranged in the first spatial position when the door drive is mounted in the first drive position, and in the second spatial position when the door drive is mounted in the second spatial position. All the advantages and further developments described in connection with the user interface unit according to the invention also relate to the door drive according to the invention and vice versa.

The door drive is preferably designed to drive a DIN door hinged on the left as a left-handed door drive in the first drive position, and a DIN door hinged on the right as a right-handed door drive in the second position.

The door drive can in particular be designed to be mounted in the first drive position on a DIN door hinged on the left on the opening side, and on the closing side in a DIN door hinged on the right, and in the second drive position on the opening side in a DIN door hinged on the right, and on the closing side in a DIN door hinged on the left.

BRIEF DESCRIPTION OF THE DRAWINGS

The invention is described below by means of figures. In the figures, each in a schematic representation:

FIG. 8 shows an arrangement of the door drive with the second embodiment of the user interface unit on a DIN door hinged on the left in the first spatial position with head mounting;

FIG. 9 shows an arrangement of the door drive with the second embodiment of the user interface unit on a DIN door hinged to the right in the second spatial position with head mounting; and FIG. 10 shows an arrangement of the door drive with the second embodiment of the user interface unit on the DIN door hinged on the left with door leaf mounting.

DETAILED DESCRIPTION OF THE DRAWINGS

Figure 1:
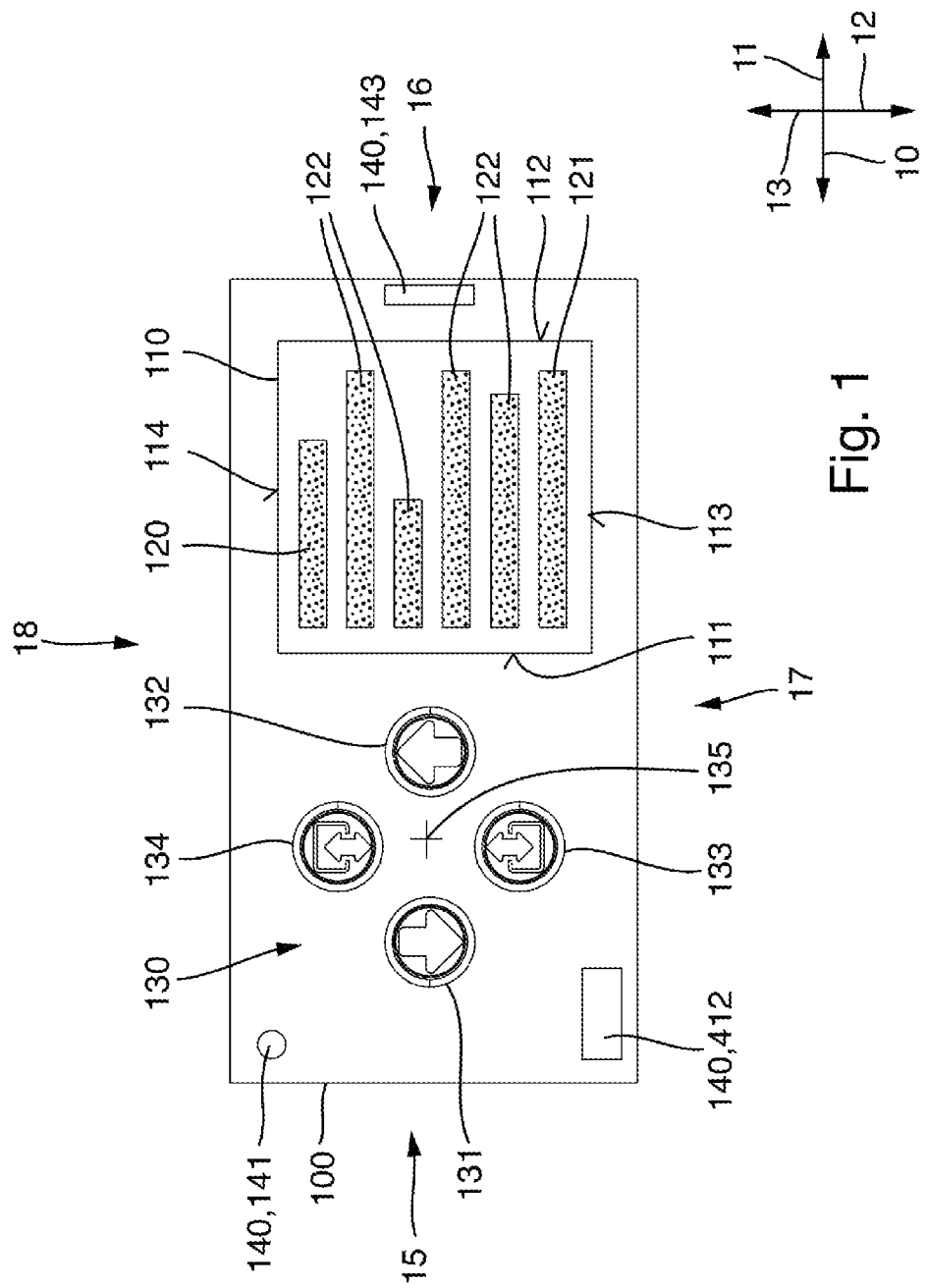
FIG. 1 shows a first embodiment of a user interface unit for a door drive in a first spatial position.

FIG. 1 shows a first embodiment of a user interface unit 100 for a door drive (not shown) in a first spatial position. The user interface unit 100 comprises a display unit 110 and a control element arrangement 130.

The display unit 110 has a first side 111, a second side 112, arranged opposite the first side 111 and parallel to the first side 111, as well as a third side 113, oriented perpendicular to the first side 111 and the second side 112, and a fourth side 114 opposite the third side 113 and arranged parallel to the third side 113. The control element arrangement 130 comprises a first control element 131, a second control element 132, a further first control element 133, and a further second control element 134. With respect to a centre 135 of the control element arrangement 130, the second control element 132 is arranged opposite the first control element 131 and the further second control element 134 is arranged opposite the further first control element 133. The control element arrangement 130 is point-symmetrical with respect to the centre 135 of the control element arrangement 130 and is arranged completely on the first side 111 of the display unit 110.

The user interface unit 100 also comprises a connecting means arrangement 140 with a first connecting element 141, a second connecting element 142, and a third connecting element 143. The connecting elements 141, 142, 143 serve for the electrical and mechanical connection of the user interface unit 100 to a door drive.

Figure 2:
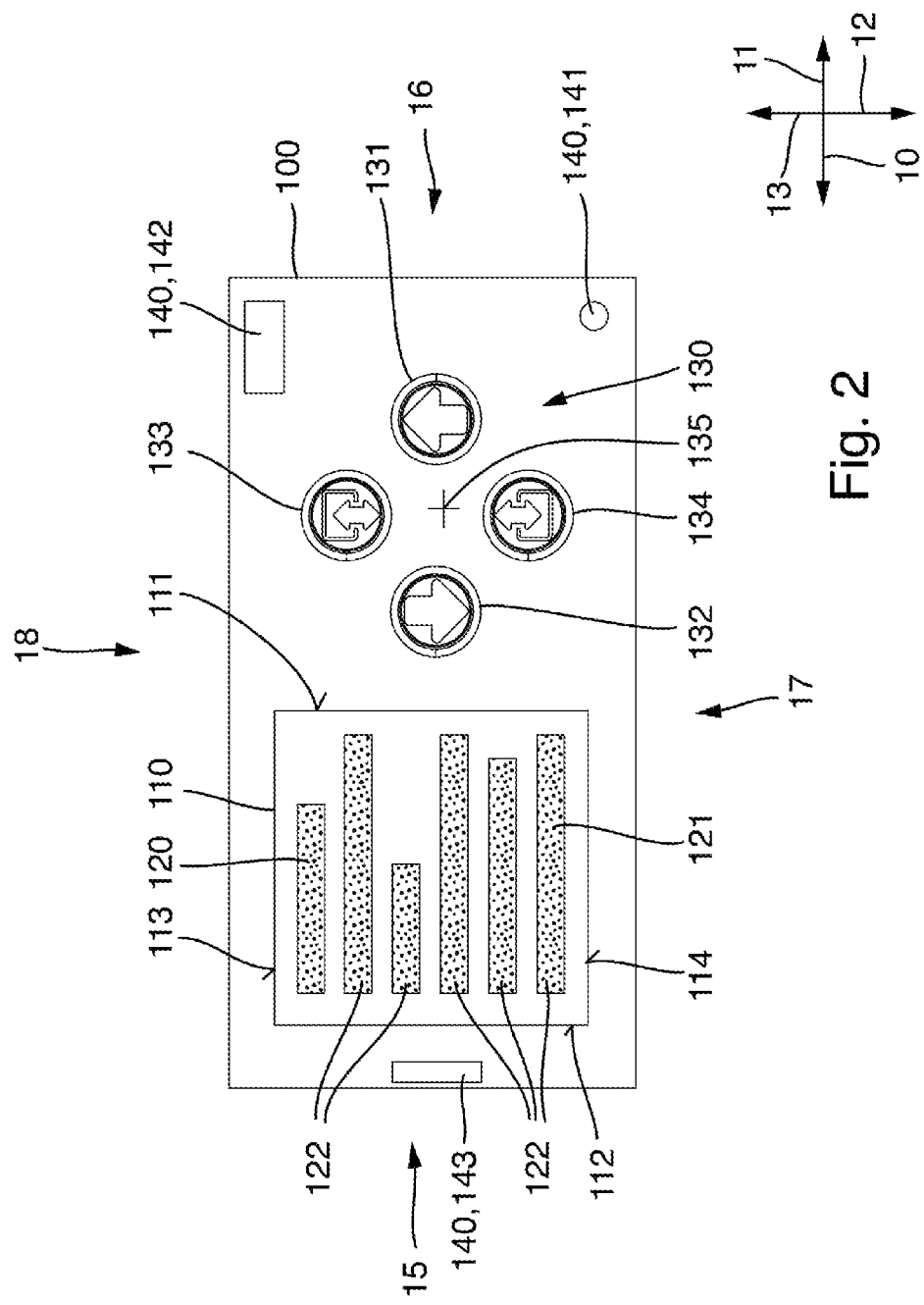
FIG. 2 shows the first embodiment of the user interface unit in a second spatial position.

While the user interface unit 100 is shown in the first spatial position in FIG. 1, it is shown in a second spatial position in FIG. 2. A change in position by which the user interface unit 100 is transferred from the first spatial position to the second spatial position consists of rotating the user interface unit 100 by 180° about an axis of rotation oriented perpendicular to a display plane of the display unit 110.

In the first spatial position of the user interface unit 100, the first side 111 of the display unit 110 is arranged on a first spatial side 15, the second side 112 of the display unit 110 is arranged on a second spatial side 16 opposite the first spatial side 15, and the third side 113 of the display unit 110 is arranged on a third spatial side 17, and the fourth side 114 of the display unit 110 is arranged on a fourth spatial side 18 of the display unit 110 opposite the third spatial side 17. The first side 111 here delimits the display unit 110 in a first spatial direction 10, the second side 112 in a second spatial direction 11, the third side 113 in a third spatial direction 12, and the fourth side 114 in a fourth spatial direction 13.

In the second spatial position of the user interface unit 100, the first side 111 of the display unit 110 is arranged on the second spatial side 16, the second side 112 of the display unit 110 is arranged on the first spatial side 15, the third side 113 of the display unit 110 is arranged on the fourth spatial side 18, and the fourth side 114 of the display unit 110 is arranged on the third spatial side 17 of the display unit 110. The first side 111 here delimits the display unit 110 in the second spatial direction 11, the second side 112 in the first spatial direction 10, the third side 113 in the fourth spatial direction 13, and the fourth side 114 in the third spatial direction 12.

In the first spatial position of the user interface unit 100 shown in FIG. 1, with respect to the centre 135 of the control element arrangement 130, the first control element 131 is arranged on the first spatial side 15, the second control element 132 is arranged on the second spatial side 16, and the further first control element 133 is arranged on the third spatial side 17, and the further second control element 134 is arranged on the fourth spatial side 18. In the second spatial position of the user interface unit 100 shown in FIG. 2, with respect to the centre 135 of the control element arrangement 130, the first control element 131 is arranged on the second spatial side 16, the second control element 132 is arranged on the first spatial side 15, and the further first control element 133 is arranged on the fourth spatial side 18, and the further second control element 134 is arranged on the third spatial side 17 of the control element arrangement 130.

When the user interface unit 100 is oriented vertically, the first spatial side 15 forms a left side, the second spatial side 16 a right side, the third spatial side 17 an underside, and the fourth spatial side 18 an upper side. The first spatial direction 10 is then oriented to the left, the second spatial direction 11 to the right, the third spatial direction 12 downwards, and the fourth spatial direction 13 upwards.

The first and second control elements 131, 132 each have a direction-dependent symbol graphic, namely an arrow. The symbol graphics of the first and second control elements 131, 132 are oriented opposite each other, so that they can be converted into one another by means of the change in position on which the transfer of the user interface unit 100 from the first position to the second position is based, namely by means of a rotation by 180° about the axis of rotation oriented perpendicular to the display plane of the display unit 110. The further first and the further second control elements 133, 134 each have a further direction-dependent symbol graphic, differing from the symbol graphic of the first and second control elements 131, 132. The further symbol graphics of the further first and further second control elements 133, 134 are likewise oriented opposite one another and can be converted into one another by means of said change in position.

In particular, the first control element 131 in the first spatial position and the second control element 132 in the second spatial position, as well as the second control element 132 in the first spatial position and the first control element 131 in the second spatial position, each have the same spatial orientation. The same applies to the first further control element 133 and the second further control element 134.

The display unit 110 is designed to display, both in the first spatial position and in the second spatial position, first output information 120 displayed on the upper side of the display unit 110 by means of second output information 121 displayed on the lower side of the display unit 110, and, between the first output information 120 and the second output information 121, to display further output information 122 in the same order. The display unit 110 thus displays the output information 120, 121, 122 in the same spatial orientation both in the first spatial position and in the second spatial position. In the first spatial position, the first output information 120 is arranged on the fourth side 114 of the display unit 110 and the second output information 121 is arranged on the third side 113 of the display unit 110, in the second spatial position it is the other way round.

The individual pieces of output information 120, 121, 122 each form menu items of a selection menu shown in the display unit 110. A selection element for selecting the individual menu items is shifted downwards in the third spatial direction 17 by means of the first control element 131 in the first spatial position, and by means of the second control element 132 in the second spatial position. In addition, the selection element is shifted upwards in the fourth spatial direction 18 by means of the second control element 132 in the first spatial position, and by means of the first control element 131 in the second spatial position.

In the first spatial position, the selectable menu item for changing or for displaying a subordinate sub-menu is selected by means of the further first control element 133, and the menu item deselected by means of the further second control element 134 for cancelling the change or for displaying a superordinate menu. In the second spatial position, this is the other way round.

Figure 3:
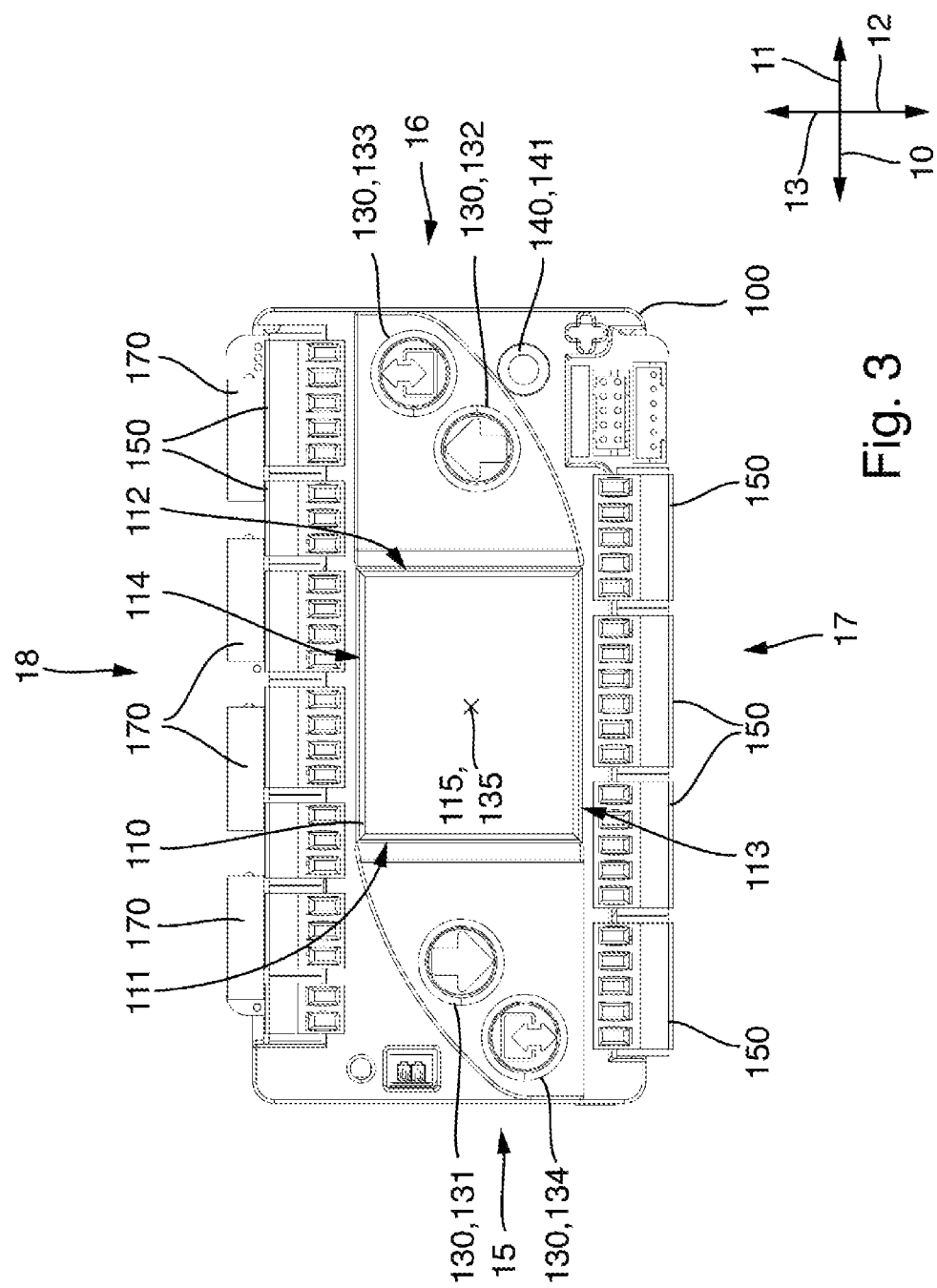
FIG. 3 shows a second embodiment of a user interface unit for a door drive in a first spatial position.
Figure 4:
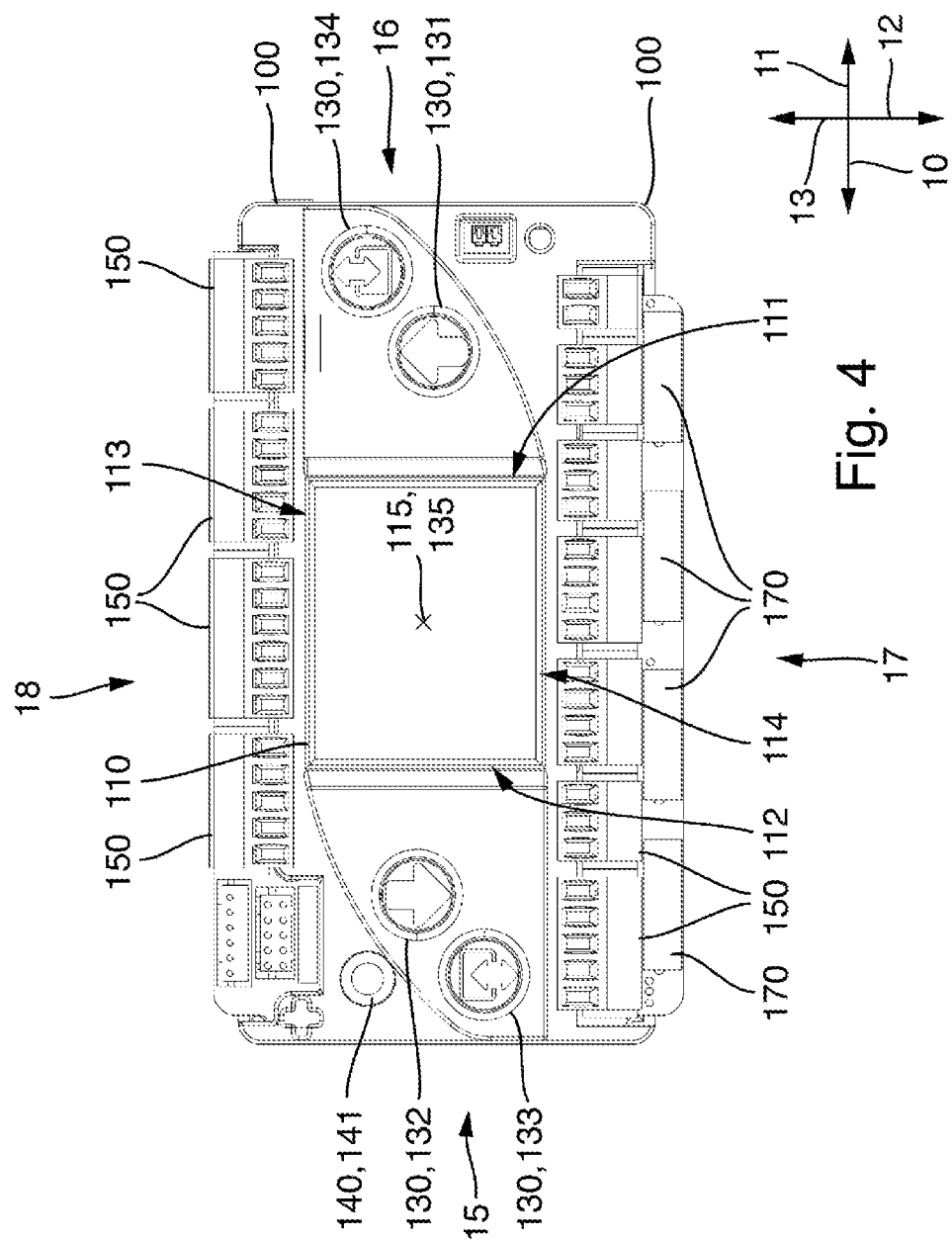
FIG. 4 shows the second embodiment of the user interface unit in a second spatial position.

FIG. 3 shows a second embodiment of a user interface unit 100 in a first spatial position, and FIG. 4 shows the second embodiment of the user interface unit 100 in a second spatial position. Where no differences are shown or described, the user interface unit 100 in the second embodiment is designed as is shown and described for the first embodiment of the user interface unit 100.

In the second embodiment, the control element arrangement 130 is designed point-symmetrical with respect to a centre 115 of the display unit 110. The first control element 131 and the further second control element 134 are arranged on the first side 111 of the display unit 110, and the second control element 132 as well as the further first control element 133 are arranged on the second side 112 of the display unit 110. As a result, in the first spatial position of the user interface unit 100, the first control element 131 and the further second control element 134 are arranged on the first spatial side 15 of the display unit 110, and on the second spatial side 16 of the user interface unit 100 in the second spatial position of the user interface unit 100. In a similar manner, in the first spatial position of the user interface unit 100, the second control element 132 and the further first control element 133 are arranged on the second spatial side 16 of the display unit 110, and on the first spatial side 15 of the display unit 100 in the second spatial position of the user interface unit 110.

The user interface unit 100 is designed as a connection unit for connecting the door drive to sensors and actuators. For this purpose, the user interface unit 100 comprises a connecting element arrangement with multiple connecting elements 150, which are designed as terminal contacts. The connecting element arrangement is not invariant with respect to the change in position for transferring the user interface unit 100 from the first spatial position to the second spatial position. The connecting elements 150 are arranged on the third side 113 and the fourth side 114 of the display unit 110. The display unit 110 and the control element arrangement 130 are located between the connecting elements 150 of the connecting element arrangement.

Figure 5:
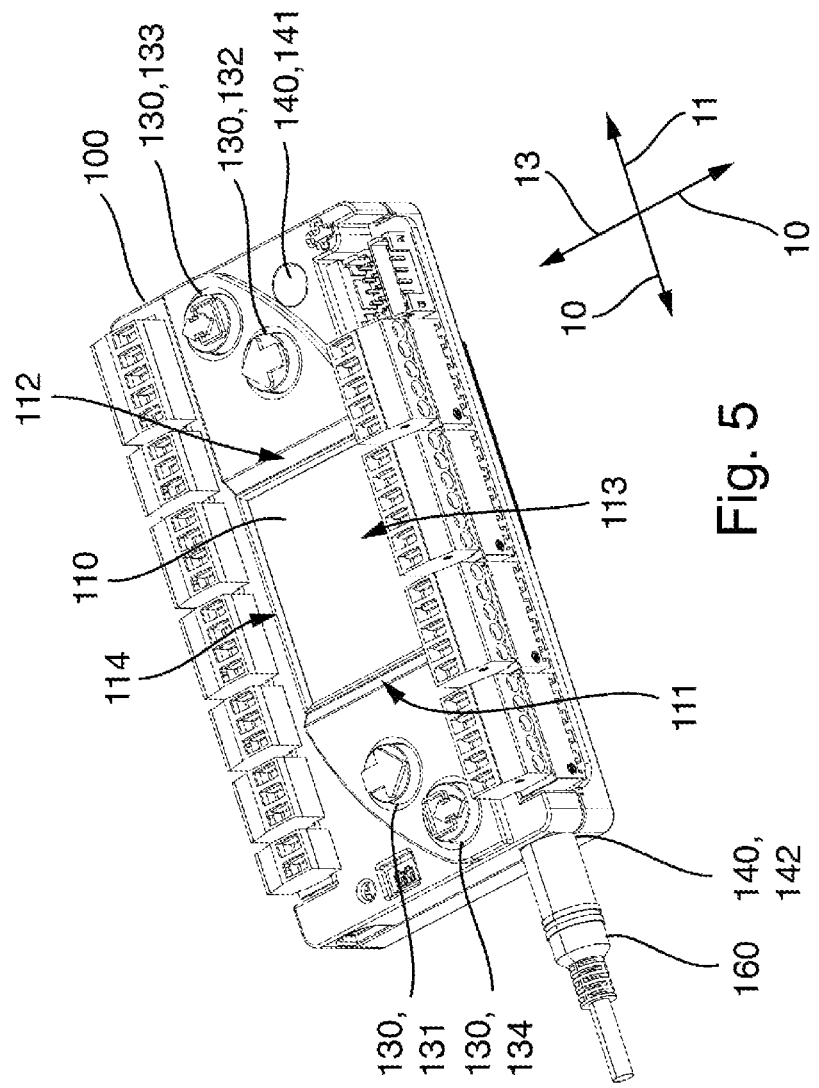
FIG. 5 shows a perspective view of the second embodiment of the user interface unit.

FIG. 5 shows the second embodiment of the user interface unit 100 in a perspective view. In the second embodiment of the user interface unit 100, the second connecting element 142 is designed as a plug connection for connecting a data cable 160, which connects the user interface unit 100 to a service tool or to a programming device or to the door drive. The user interface unit 100 is designed to be connected, via the data cable 160, to a programming connection of a door drive, such as an external programming and/or reading device.

Figure 6:
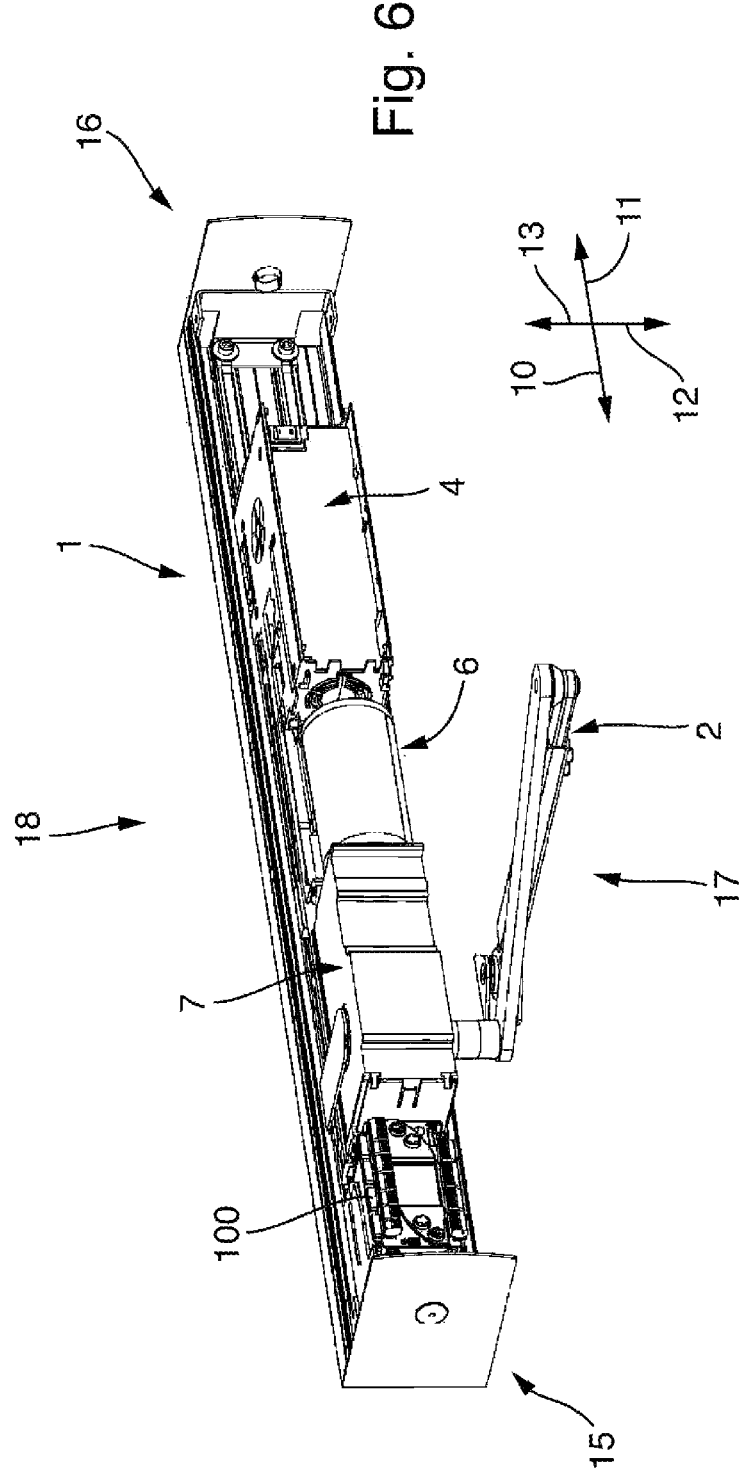
FIG. 6 shows a door drive with the second embodiment of the user interface unit in a perspective view.
Figure 7:
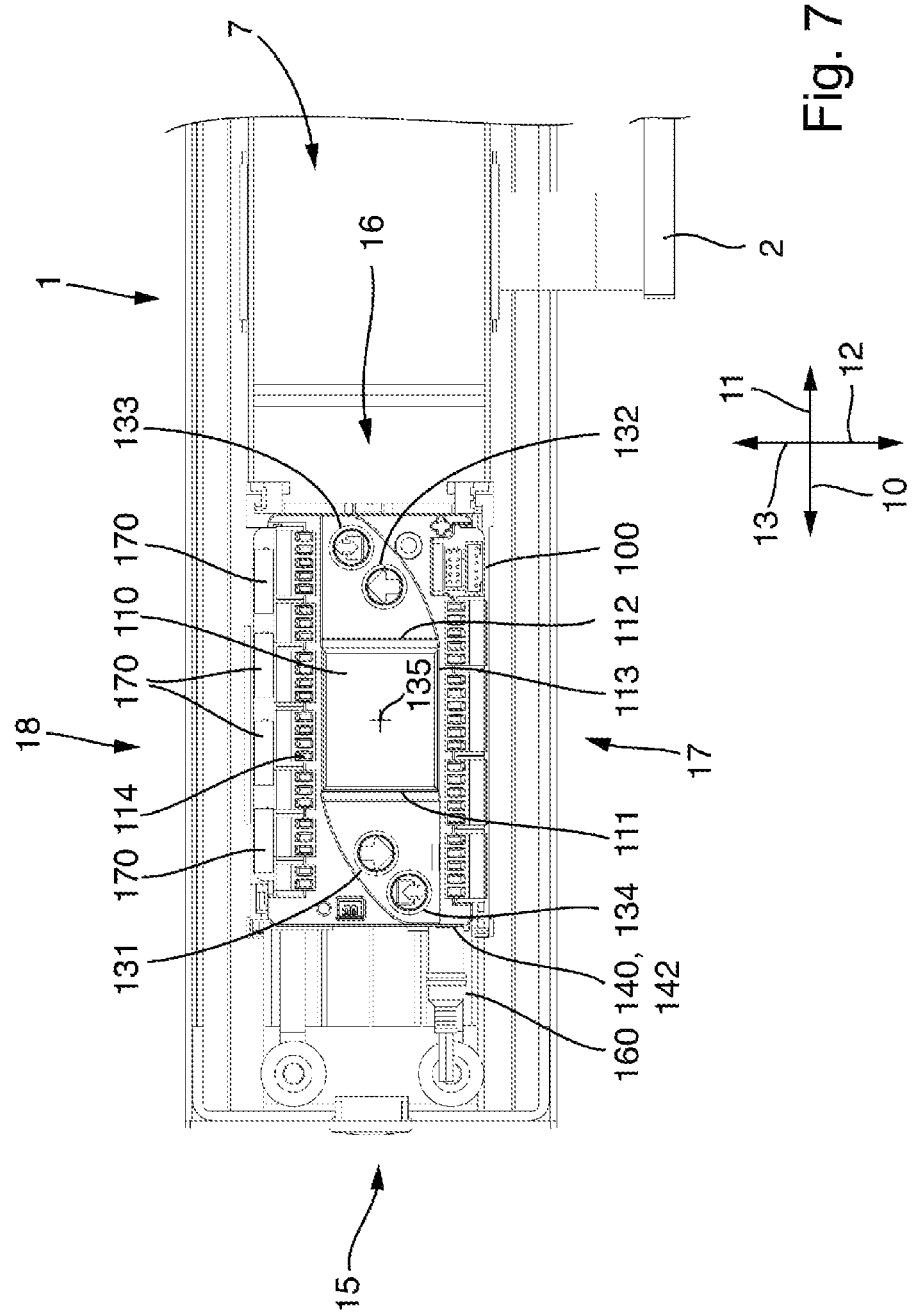
FIG. 7 shows an enlarged plan view of the door drive with the second embodiment of the user interface unit in the first spatial position.

FIGS. 6 and 7 each show an arrangement of the second embodiment of the user interface device 100 on a door drive 1. In addition to the user interface unit 100, the door drive 1 comprises a control unit 4, an electric motor 6, and a transmission 7, which is connected to the motor 6 on a drive side. The control unit 4, the motor 6, the transmission 7, and the user interface device 100 are fastened next to one another on a base plate of the door drive 1 and can be covered with a housing cover (not shown) of the door drive 1. To transmit the driving force generated by the motor 6 to the door to be driven, the door drive 1 has a connecting element 2 which is connected to an output side of the transmission 7 and is designed as a linkage.

The user interface unit 100, the transmission 7, the motor 6, and the control unit 4 in turn are arranged on the base plate of the door drive 1. The control unit 4 is connected to the motor 6 by means of control lines and serves to control a movement of the motor 6. The user interface unit 100 is connected to the control unit 4 of the door drive 1 by means of connecting elements 170, shown in FIGS. 3, 4, and 7, by means of data transmission elements, not shown, in particular ribbon cables, in order to permit configuration of the control unit 4 and to display a status of the control unit 4.

The door drive 1, in particular the control unit 4, is designed to be configured not only via the user interface unit 100, but also via an external programming device. For this purpose, the external programming device can be connected to the programming connection of the door drive 1, such as the user interface unit 100, or by means of the data cable 160 of the user interface unit 100. In addition to the door drive 1 and the user interface unit 100, a drive system can therefore also comprise said programming device. The door drive 1 can then either be connected to the external programming device for configuration, or the user interface unit 100 can be arranged in the door drive 1 and connected to the control unit 4 for configuration. A user interface of the programming device can be designed analogously to the user interface of the user interface unit 100 and in particular can comprise the display unit 110 and the control element arrangement 130. In addition, the user interface unit 100 and the programming device can be designed to communicate with the control unit 4 via the programming interface by means of the same data coding.

FIG. 8 shows an arrangement of the door drive 1 shown in FIGS. 6 and 7 for head mounting on a DIN door 20 hinged on the left. FIG. 8 shows the door 20 in a top view of an opening side so that a door hinge 24 arranged on the left side of the door 20 is visible. For the head mounting, the door drive 1 with the base plate is fastened on a frame of the door 20 and mechanically connected to a door leaf 22 of the door 20 arranged under the door drive 1 by means of the connecting element 2. The door drive 20 is located in the fourth spatial direction 13 above the door 20. In the mounting shown in FIG. 8, the door drive 1 is mounted in a first drive position on the opening side of a door 20 hinged on the left, in which the user interface unit 100 is located in its first spatial position and is arranged on the first spatial side 15 of the door drive 1.

FIG. 9 shows an arrangement of the door drive 1 for head mounting on a DIN door 20 hinged on the right. FIG. 9 also shows the door 20 in a top view of an opening side so that a door hinge 24 arranged on the right side of the door 20 is visible. The door drive 20 is mounted in a second drive position, in which the user interface unit 100 is located in its second spatial position and is arranged on the second spatial side 16 of the door drive 1.

FIG. 10 shows an arrangement of the door drive 1 with door leaf mounting on the DIN door 20 hinged on the left, wherein the door 20 and the door drive 1 are shown in a top view of the opening side of the door 20. As with the head mounting shown in FIG. 8, the door drive 20 is mounted in the first drive position, in which the user interface unit 100 is located in its first spatial position and is arranged on the first spatial side 15 of the door drive 1. In contrast to the head mounting shown in FIG. 8, the connecting element 2 in the door leaf mounting shown in FIG. 10 is connected to the transmission 7 not on an underside of the transmission 7 in the direction of the third spatial direction 17, but on an upper side of the transmission 7 in the direction of the fourth spatial direction 18.

For one mounting (not shown) of the door drive 1 on the closing side of a door, the door drive is mounted in the second drive position for a DIN door hinged on the left, and in the first drive position for a DIN door 20 hinged on the right.

LIST OF REFERENCE SYMBOLS

1 Door drive
2 Connecting element
4 Control unit
6 Motor
7 Transmission
10 First spatial direction
11 Second spatial direction
12 Third spatial direction
13 Fourth spatial direction
15 First spatial side
16 Second spatial side
17 Third spatial side
18 Fourth spatial side 20 Door
22 Door leaf
24 Door hinge
100 User interface unit
110 Display unit
111 First side
112 Second side
113 Third side
114 Fourth side
115 Centre
120 First output information
121 Second output information
122 Further output information
130 Control element arrangement
131 First control element
132 Second control element
133 Further first control element
134 Further second control element
135 Centre
140 Connecting means arrangement
141 First connecting element
142 Second connecting element
143 Third connecting element
150 Connecting element
160 Data cable
170 Connecting element

The invention claimed is:

1. A user interface unit (100) for an automatic door drive (1), having a display unit (110) for outputting output information (120, 121, 122) and a control element arrangement (130) for capturing input information,
    wherein the user interface unit (100), together with the door drive (1), is mountable in a first spatial position and in a second spatial position on a door (20) that is drivable by the door drive (1),
    wherein the control element arrangement (130) comprises a first control element (131) and a second control element (132),
    wherein the first control element (131) is arranged in the first spatial position of the user interface unit (100) on the same spatial side (15) of the control element arrangement (130) as the second control element (132) in the second spatial position,
    wherein the display unit (110) is designed to display the displayed output information (120, 121, 122) in the same spatial orientation in both the first spatial position and the second spatial position of the user interface unit (100), and
    wherein the user interface unit (100) is designed to capture the same input information in the first spatial position with the first control element (131) as with the second control element (132) in the second spatial position.

2. The user interface unit (100) according to claim 1, wherein
    an arrangement of the control elements (131, 132) of the control element arrangement (130) is invariant with respect to a transfer of the user interface unit (100) from the first spatial position to the second position.

3. The user interface unit (100) according to claim 1, wherein the control element arrangement (130) is designed point-symmetrical.

4. The user interface unit (100) according claim 1, wherein
    the user interface unit (100) can be transferred from the first position to the second position by rotating the user interface unit (100) by 180°.

5. The user interface unit (100) according to claim 1, wherein
    the first control element (131) is arranged on a first side (111) of the display unit (110) and the second control element (132) is arranged on a second side (112) of the display unit (110), and
    in that the first side (111) of the display unit (110) with the first control element (131) in the first spatial position of the user interface unit (100) is arranged on the same spatial side (15) of the of the display unit (110) as the second side (112) of the display unit (110) with the second control element (132) in the second spatial position.

6. The user interface unit (100) according to claim 5, wherein
    the first side (111) is arranged opposite the second side (112).

7. The user interface unit (100) according to claim 1, wherein the first control element (131) and the second control element (132) are designed so as not to be invariant with respect to a change in the position of the individual control elements on which the transfer of the user interface unit (100) from the first position to the second position is based, and
    the first control element (131) in the first position of the user interface unit (100) is aligned along the same spatial direction as the second control element (132) in the second position.

8. The user interface unit (100) according to claim 1, wherein
    the control element arrangement (130) has further control elements (133, 134).

9. The user interface unit (100) according to claim 1, wherein
    the user interface unit (100) is designed to illuminate the first control element (131) in a first colour and the second control element (132) in a second colour in the first position, and
    in that the user interface unit (100) is designed to illuminate the second control element (131) in the first colour in the second position.

10. The user interface unit (100) according to claim 1, wherein
    the user interface unit (100) has a position sensor for automatically determining the installation position on the driven door (20).

11. The user interface unit (100) according to claim 1, wherein the user interface unit (100) is designed to display a selection element in the display unit (110) for selecting individual information elements of the display information (120, 121, 122), and
    wherein the user interface unit (100) is designed to move the selection element in the same spatial direction (10, 11, 12, 13).

12. The user interface unit (100) according to claim 1, wherein
    the user interface unit (100) has a connecting means arrangement (140) for connection to the door drive (1), and
    in that the connecting means arrangement (140) is designed asymmetrical with respect to a transfer of the user interface unit (100) from the first position to the second position.

13. The user interface unit (100) according to claim 1, wherein
    the user interface unit (100) is designed as a connection module for connecting sensors and/or actuators of the door drive (1) to a control unit (4) of the door drive (1), for example to a control unit (4) of the door drive (1) arranged next to the user interface unit (100).

14. The user interface unit (100) according to claim 1, wherein
the user interface unit (100) is designed to capture input information for the configuration of the door drive (1) by means of the control elements (131, 132, 133, 134).

15. A door drive (1) for automatically driving a door (20) having a user interface unit (100) connected to the door drive (1) according to claim 1,
wherein the door drive (1) is mountable on the door (20) in a first spatial drive position and in a second spatial drive position,
wherein the user interface unit (100) is arranged in the first spatial position when the door drive (1) is mounted in the first drive position, and in the second spatial position when the door drive (1) is mounted in the second spatial position.

16. The door drive (1) according to claim 14, wherein
the door drive (1) is designed to drive a door hinged on the left (20) as a left-handed door drive (1) in the first drive position, and a door hinged on the right (20) as a right-handed door drive (1) in the second position.

17. The user interface unit (100) according to claim 1, wherein the control element arrangement (130) is designed point-symmetrical with respect to a center (135) of the control element arrangement or a center (115) of the display unit (110).

18. The user interface unit (100) according to claim 1, wherein the first control element (131) and the second control element (132) are designed so as not to be invariant with respect to a change in the position of the individual control elements on which the transfer of the user interface unit (100) from the first position to the second position is based, with respect to a rotation of the individual control elements by 180°, and the first control element (131) in the first position of the user interface unit (100) is aligned along the same spatial direction as the second control element (132) in the second position.

19. The user interface unit (100) according to claim 1, wherein the user interface unit (100) is designed to display a selection element in the display unit (110) for selecting individual information elements of the display information (120, 121, 122), and wherein the user interface unit (100) is designed to move the selection element in the same spatial direction (10, 11, 12, 13) upwards or downwards, when the input information is captured in the first position via the first control element (131), and in the second position via the second control element (132).

* * * * *